(12) United States Patent
Kwon et al.

(10) Patent No.: US 9,605,147 B2
(45) Date of Patent: Mar. 28, 2017

(54) THERMOPLASTIC RESIN COMPOSITION AND MOLDED ARTICLE USING SAME

(71) Applicant: Samsung SDI Co., Ltd., Yongin-si (KR)

(72) Inventors: Kee-Hae Kwon, Uiwang-si (KR); In-Chol Kim, Uiwang-si (KR); Joo-Hyun Jang, Uiwang-si (KR); Jun-Ho Chi, Uiwang-si (KR); Chang-Min Hong, Uiwang-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 14/904,806

(22) PCT Filed: May 8, 2014

(86) PCT No.: PCT/KR2014/004077
§ 371 (c)(1),
(2) Date: Jan. 13, 2016

(87) PCT Pub. No.: WO2015/016464
PCT Pub. Date: Feb. 5, 2015

(65) Prior Publication Data
US 2016/0168376 A1    Jun. 16, 2016

(30) Foreign Application Priority Data

Aug. 1, 2013  (KR) .................. 10-2013-0091613

(51) Int. Cl.
C08L 51/04 (2006.01)
C08L 69/00 (2006.01)
C08L 55/02 (2006.01)
C08L 33/10 (2006.01)

(52) U.S. Cl.
CPC .............. C08L 69/00 (2013.01); C08L 51/04 (2013.01); C08L 55/02 (2013.01); C08L 33/10 (2013.01); C08L 2205/025 (2013.01); C08L 2205/035 (2013.01); C08L 2205/06 (2013.01); C08L 2207/53 (2013.01)

(58) Field of Classification Search
None
See application file for complete search history.

(56) References Cited

U.S. PATENT DOCUMENTS

| | | | |
|---|---|---|---|
| 6,407,167 B1 | 6/2002 | Shishido et al. | |
| 7,514,502 B2 | 4/2009 | Kim et al. | |
| 7,534,832 B2 | 5/2009 | Ahn et al. | |
| 7,956,127 B2 | 6/2011 | Lee et al. | |
| 8,202,938 B2 | 6/2012 | Lee et al. | |
| 8,940,836 B2 | 1/2015 | Kwon et al. | |
| 2005/0171297 A1 | 8/2005 | Koevoets et al. | |
| 2010/0160559 A1* | 6/2010 | Lee ................. | C08L 51/003 525/67 |
| 2014/0371375 A1* | 12/2014 | Chung ............... | C08L 33/10 524/502 |
| 2015/0094444 A1 | 4/2015 | Chi et al. | |

FOREIGN PATENT DOCUMENTS

| | | |
|---|---|---|
| KR | 10-0339161 B1 | 11/2002 |
| KR | 10-2004-0105464 A | 8/2005 |
| KR | 10-2004-0057069 A | 1/2006 |
| KR | 10-2008-0063052 A | 7/2008 |
| KR | 10-2009-0034148 A | 4/2009 |
| KR | 10-2009-0052447 A | 5/2009 |
| KR | 10-2010-0050778 A | 5/2010 |
| KR | 10-2010-0073548 A | 7/2010 |
| KR | 10-2010-0069889 A | 10/2012 |
| KR | 10-1233587 B1 | 2/2013 |
| KR | 10-2013-0061560 A | 6/2013 |
| KR | 10-2013-0071265 A | 6/2013 |
| KR | 10-2013-0056127 A | 10/2014 |
| KR | 10-2013-0070415 A | 10/2014 |
| KR | 10-2014-0131784 A | 11/2014 |
| WO | 00/04095 A1 | 1/2000 |
| WO | WO 2013/094898 * | 6/2013 |
| WO | 2015/016464 A1 | 2/2015 |

OTHER PUBLICATIONS

International Search Report in counterpart International Application No. PCT/KR2014/004077 dated Aug. 18, 2014, pp. 1-4.

* cited by examiner

*Primary Examiner* — Jeffrey Mullis
(74) *Attorney, Agent, or Firm* — Additon, Higgins & Pendleton, P.A.

(57) ABSTRACT

A thermoplastic resin composition including (A) bisphenol A-based polycarbonate, (B) biphenyl group-containing polycarbonate, (C) a biphenyl group-containing or terphenyl group-containing (meth)acryl-based copolymer and (D) a graft copolymer and a molded article manufactured from the same.

13 Claims, No Drawings

THERMOPLASTIC RESIN COMPOSITION AND MOLDED ARTICLE USING SAME

FIELD OF THE INVENTION

This disclosure relates to a thermoplastic resin composition and a molded article using the same.

DESCRIPTION OF THE RELATED ART

A thermoplastic resin has improved properties such as lower specific gravity than glass or metal and improved formability, impact resistance, and the like. Recently, the thermoplastic resin has been used to manufacture plastic products, as electric/electronic products tend to cost lower and become larger and lighter, and the plastic products have rapidly replaced conventional glass or metal products and been widely used from electric/electronic products to automobile parts.

Accordingly, there are needs for scratch resistance against external impact or defects. An acryl-based resin represented by a PMMA (polymethylmethacrylate) resin has improved transparency, weather resistance, mechanical strength, surface gloss, adherence, and the like and particularly, very improved scratch resistance but very weak impact resistance.

In order to improve impact properties of the PMMA resin, an acryl-based impact-reinforcing agent having a similar refractive index thereto may be applied, but since heat resistance and mechanical properties are deteriorated due to a rubber component therein, flame retardancy is difficult to secure.

On the other hand, a PC (polycarbonate) resin has very excellent transparency, impact properties, and mechanical properties and also, excellent flame retardancy and thus is widely applied to electric/electronic/vehicle interior and exterior materials but has a drawback of very weak scratch resistance.

In order to improve the scratch resistance of the PC resin, a modified polycarbonate copolymer may be used but has a problem of deteriorating the impact properties, since the amount of a comonomer having a brittle structure is also increased. In order to solve the problem and accomplish both excellent scratch resistance of the PMMA resin and excellent impact properties of the PC resin, a PC/PMMA resin may be prepared by blending the polycarbonate and the acryl-based resin.

However, the PC/PMMA resin may hardly secure transparency and high coloring due to compatibility and refractive index differences between the PC resin and the PMMA resin during the blending. Particularly, when an acryl-based copolymer resin having a high refractive index is used, more excellent impact properties may be secured than when only the molecular weight of the PMMA is decreased. But when the amount of the acryl-based copolymer resin is increased to secure scratch resistance, the acryl-based copolymer resin may rarely secure high impact properties due to low impact properties and thus is limitedly used.

In order to increase scratch resistance of the PC, a modified polycarbonate-based copolymer having excellent scratch resistance may be used but have a relative limit in securing scratch resistance due to relatively lower scratch resistance than that of the acryl-based resin.

TECHNICAL OBJECT

One embodiment provides a thermoplastic resin composition having improved impact resistance, coloring properties and scratch resistance.

Another embodiment provides a molded article using the thermoplastic resin composition.

TECHNICAL SOLUTION

In one embodiment of the present invention, a thermoplastic resin composition includes (A) bisphenol A-based polycarbonate, (B) biphenyl group-containing polycarbonate, (C) a biphenyl group-containing or terphenyl group-containing (meth)acryl-based copolymer, and (D) a graft copolymer.

The thermoplastic resin composition may include 10 to 85 wt % of (A) the bisphenol A-based polycarbonate, 5 to 80 wt % of (B) the biphenyl group-containing polycarbonate, 5 to 50 wt % of (C) the biphenyl group-containing or terphenyl group-containing (meth)acryl-based copolymer, and 1 to 50 parts by weight of (D) the graft copolymer based on 100 parts by weight of the (A) to (C).

The bisphenol A-based polycarbonate (A) may be prepared by reacting a compound selected from phosgene, halogen formate, dialkyl carbonate, diaryl carbonate, and a combination thereof and 2,2-bis-(4-hydroxyphenyl)-propane (bisphenol A).

A weight average molecular weight of the bisphenol A-based polycarbonate (A) may be 10,000 to 50,000 g/mol.

The biphenyl group-containing polycarbonate (B) may include a repeating unit represented by Chemical Formula 1, a repeating unit represented by Chemical Formula 2, and a repeating unit represented by Chemical Formula 3.

[Chemical Formula 1]

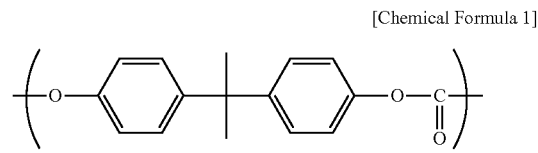

[Chemical Formula 2]

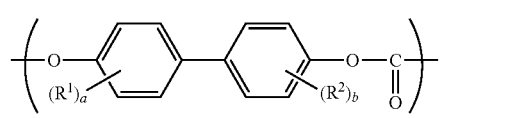

In Chemical Formula 2,
$R^1$ and $R^2$ are independently a substituted or unsubstituted C1 to C6 alkyl group, and a and b are independently an integer ranging from 0 to 4.

[Chemical Formula 3]

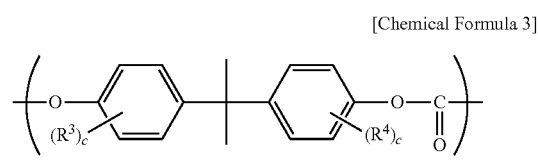

In Chemical Formula 3,
$R^3$ and $R^4$ are independently a substituted or unsubstituted C1 to C6 alkyl group, and c and d are independently an integer ranging from 1 to 4.

The biphenyl group-containing polycarbonate (B) may include 10 to 80 mol % of the repeating unit represented by Chemical Formula 3.

The biphenyl group-containing polycarbonate (B) may include 10 to 85 mol % of the repeating unit represented by Chemical Formula 1, 5 to 30 mol % of the repeating unit represented by Chemical Formula 2, and 10 to 80 mol % of the repeating unit represented by Chemical Formula 3.

A weight average molecular weight of the biphenyl group-containing polycarbonate (B) may be 20,000 to 40,000 g/mol.

The biphenyl group or terphenyl group-containing (meth)acryl-based copolymer (C) may include a repeating unit derived from aromatic (meth)acrylate (C-1) having a refractive index of 1.58 to 1.70 and a repeating unit derived from a mono-functional unsaturated monomer (C-2).

The aromatic (meth)acrylate (C-1) having a refractive index of 1.58 to 1.70 may be represented by Chemical Formula 4.

[Chemical Formula 4]

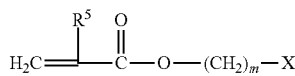

In Chemical Formula 4, $R^5$ is hydrogen or a methyl group, m is an integer ranging from 0 to 10, X is an orthobiphenyl group, a metabiphenyl group, a parabiphenyl group, a 2,6-terphenyl group, an orthoterphenyl group, a metaterphenyl group, or a paraterphenyl group.

The mono-functional unsaturated monomer (C-2) may be one or more selected from C1 to C8 alkyl(meth)acrylate; unsaturated carboxylic acid; acid anhydride; C1 to C8 hydroxy alkyl(meth)acrylate; N-alkyl(meth)acrylamide; (meth)acrylamide; unsaturated nitrile-based monomer; allyl glycidyl ether; glycidyl(meth)acrylate; and an aromatic vinyl-based monomer.

The biphenyl group or terphenyl group-containing (meth)acryl-based copolymer (C) may be a copolymer of 1 to 50 wt % of the aromatic (meth)acrylate (C-1) having a refractive index of 1.58 to 1.70 and 50 to 99 wt % of the mono-functional unsaturated monomer (C-2).

The biphenyl group or terphenyl group-containing (meth)acryl-based copolymer (C) may have a refractive index of 1.490 to 1.579 and may further include 49 wt % or less of alicyclic or aromatic (meth)acrylate (C-3) represented by Chemical Formula 5 or Chemical Formula 6.

[Chemical Formula 5]

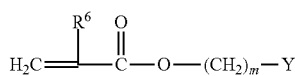

In Chemical Formula 5, $R^6$ is hydrogen or a methyl group, m is an integer ranging from 0 to 10, and Y is selected from the group consisting of a cyclohexyl group, a phenyl group, a methylphenyl group, a methylethylphenyl group, a methoxyphenyl group, a propylphenyl group, a cyclohexylphenyl group, a chlorophenyl group, a bromophenyl group, and a benzylphenyl group;

[Chemical Formula 6]

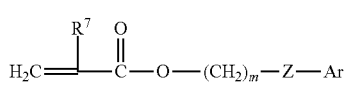

In Chemical Formula 6, $R^7$ is hydrogen or a methyl group, m is an integer ranging from 0 to 10, Z is oxygen (O) or sulfur (S), and Ar is selected from the group consisting of a cyclohexyl group, a phenyl group, a methylphenyl group, a methylethylphenyl group, a methoxyphenyl group, a cyclohexylphenyl group, a chlorophenyl group, a bromophenyl group, and a benzylphenyl group.

A weight average molecular weight of the biphenyl group or terphenyl group-containing (meth)acryl-based copolymer (C) may be 10,000 to 300,000 g/mol.

A refractive index of the biphenyl group or terphenyl group-containing (meth)acryl-based copolymer (C) may be 1.495 to 1.640.

The graft copolymer (D) may have a core-shell structure including a diene-based rubber core.

The graft copolymer (D) may include a shell including at least one compound selected from an acryl-based monomer, an aromatic vinyl-based monomer, an unsaturated nitrile-based monomer, and a combination thereof, and grafted on the diene-based rubber core.

The graft copolymer (D) may include 30 to 80 wt % of the diene-based rubber core.

An average particle diameter of the graft copolymer (D) may be 100 to 500 nm.

In another embodiment of the present invention, a molded article manufactured using the thermoplastic resin composition is provided.

The molded article may have pencil hardness of HB to 2H measured by JIS K 5401 evaluation method.

The molded article may have a scratch resistance width of 230 to 310 μm measured by a BSP evaluation method.

The molded article may have an Izod impact strength of 7 to 60 kgf·cm/cm in a ⅛" thickness measured according to ASTM D256.

ADVANTAGEOUS EFFECT

The thermoplastic resin composition and the molded article using the same have improved impact resistance, coloring properties and scratch resistance.

DETAILED DESCRIPTION

Hereinafter, embodiments of the present invention are described in detail. However, these embodiments are exemplary, the present invention is not limited thereto and the present invention is defined by the scope of claims.

In the present specification, when specific definition is not otherwise provided, "(meth)acrylate" refers to acrylate or methacrylate, "(meth)acrylic acid" refers to acrylic acid or methacrylic acid, and "(meth)acrylamide" refers to acrylamide or methacrylamide.

In the present specification, when a definition is not otherwise provided, "alkyl" refers to a C1 to C30 alkyl group, specifically a C1 to C20 alkyl group, and "aryl" refers to C6 to C20 aryl.

In one embodiment of the present invention, a thermoplastic resin composition includes (A) bisphenol A-based polycarbonate, (B) a biphenyl group-containing polycarbonate, (C) a biphenyl group or a terphenyl group-containing (meth)acryl-based copolymer, and (D) a graft copolymer.

Specifically, the thermoplastic resin composition may include 10 to 85 wt % of (A) the bisphenol A-based polycarbonate, 5 to 80 wt % of (B) the biphenyl group-containing polycarbonate, 5 to 50 wt % of (C) the biphenyl group-containing or terphenyl group-containing (meth)acryl-based copolymer and 1 to 50 parts by weight of (D) the graft copolymer based on 100 parts by weight of the (A) to (C).

(A) Bisphenol A-Based Polycarbonate

The bisphenol A-based polycarbonate (A) may be prepared by reacting a compound selected from phosgene, halogen formate, dialkyl carbonate, diaryl carbonate, and a combination thereof and 2,2-bis-(4-hydroxyphenyl)-propane (bisphenol A).

The diaryl carbonate or dialkyl carbonate may be any known compound that is usable for preparation of polycarbonate. Specific examples may be diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, dicyclohexyl carbonate, and the like, but are not limited thereto. These may be used singularly or in a combination of two or more.

A weight average molecular weight of the bisphenol A-based polycarbonate (A) may be 10,000 to 50,000 g/mol, and specifically 15,000 to 40,000 g/mol, but is not limited thereto.

The bisphenol A-based polycarbonate (A) may be included in an amount of 10 to 85 wt %, specifically 10 to 70 wt % based on the total weight of the (A) to (C).

(B) Biphenyl Group-Containing Polycarbonate

The biphenyl group-containing polycarbonate (B) may include a repeating unit represented by Chemical Formula 1, a repeating unit represented by Chemical Formula 2 and a repeating unit represented by Chemical Formula 3.

[Chemical Formula 1]

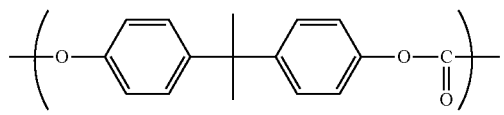

[Chemical Formula 2]

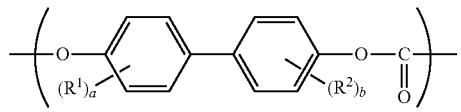

In Chemical Formula 2,
$R^1$ and $R^2$ are independently a substituted or unsubstituted C1 to C6 alkyl group, and a and b are each independently an integer ranging from 0 to 4.

[Chemical Formula 3]

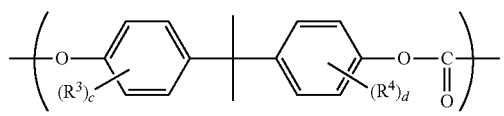

In Chemical Formula 3,
$R^3$ and $R^4$ are independently a substituted or unsubstituted C1 to C6 alkyl group, and c and d are independently an integer ranging from 1 to 4.

Specifically, the biphenyl group-containing polycarbonate (B) may be prepared by reacting (e.g., condensation-reacting or ester exchange reacting) a diol mixture of 2,2-bis(4-hydroxyphenyl)propane (bisphenol A), biphenyl diol of Chemical Formula 2-1 and dialkyl bisphenol A of Chemical Formula 3-1 with a compound selected from phosgene, halogen formate, diaryl carbonate, dialkyl carbonate, and a combination thereof.

[Chemical Formula 2-1]

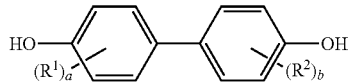

In Chemical Formula 2-1,
$R^1$ and $R^2$ are independently a substituted or unsubstituted C1 to C6 alkyl group, and a and b are independently an integer ranging from 0 to 4.

[Chemical Formula 3-1]

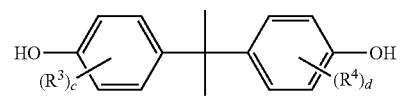

In Chemical Formula 3-1,
$R^3$ and $R^4$ are independently a substituted or unsubstituted C1 to C6 alkyl group, and c and d are independently an integer ranging from 1 to 4.

The bisphenol A may be used in an amount of 10 to 85 mol %, specifically, 20 to 70 mol %, or 20 to 60 mol %. Within the range, the prepared polycarbonate may have improved mechanical properties such as Izod impact strength.

Specific examples of the biphenyl diol of Chemical Formula 2-1 may be 4,4'-biphenol, 2,2'-dimethyl 4,4'-biphenyldiol, 3,3'-dimethyl 4,4'-dihydroxy biphenyl, 2,2',6,6'-tetramethyl-4,4'-biphenol, and the like, but are not limited thereto. For example, 4,4'-biphenol may be used. The biphenyl diol of Chemical Formula 2-1 may be used in an amount of 5 to 30 mol %, and specifically 10 to 30 mol %, or 10 to 25 mol %. Within the range, the prepared polycarbonate may have improved solvent resistance.

Specific examples of dialkyl bisphenol A of Chemical Formula 3-1 may be 2,2-bis-(3,5-dimethyl-4-hydroxyphenyl)-propane, 2,2-bis-(3,5-diethyl-4-hydroxyphenyl)-propane, 2,2-bis-(3,5-diisopropyl-4-hydroxyphenyl)-propane, 2,2-bis-(3,5-dibutyl-4-hydroxyphenyl)-propane, and the like, but are not limited thereto. For example, 2,2-bis-(3,5-dimethyl-4-hydroxyphenyl)-propane may be used. The dialkyl bisphenol A may be used in an amount of 10 to 80 mol %, preferably 20 to 70 mol %, and more preferably 30 to 70 mol %.

The diaryl carbonate or dialkyl carbonate may be any known compound that is usable for preparation of polycarbonate. Specific examples may be diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate, dicyclohexyl carbonate, and the like, but are not limited thereto. These may be used singularly or in a combination of two or more.

In the prepared biphenyl group-containing polycarbonate (B), the repeating unit represented by Chemical Formula 3 may be included in an amount of 10 to 80 mol %. In this case, scratch resistance may be ensured and simultaneously impact strength may be improved.

Specifically, in the biphenyl group-containing polycarbonate (B), the repeating unit represented by Chemical Formula 1 may be included in an amount of 10 to 85 mol %, the repeating unit represented by Chemical Formula 2 may be included in an amount of 5 to 30 mol % and the repeating unit represented by Chemical Formula 3 may be included in an amount of 10 to 80 mol. In this case, property balance of impact resistance, scratch resistance, chemical resistance and fluidity may be improved.

A weight average molecular weight of the biphenyl group-containing polycarbonate (B) may be 20,000 to 40,000 g/mol. Within the molecular weight range, molded articles having improved scratch resistance and impact resistance and coloring properties may be provided.

The biphenyl group-containing polycarbonate (B) may be included in an amount of 5 to 80 wt %, and specifically 18 to 72 wt % based on the total weight of the (A) to (C). In this case, the thermoplastic resin composition may realize excellent impact resistance, coloring properties and scratch resistance.

(C) Biphenyl Group or Terphenyl Group-Containing (Meth)Acryl-Based Copolymer

The biphenyl group or terphenyl group-containing (meth) acryl-based copolymer (C) may include a repeating unit derived from aromatic (meth)acrylate (C-1) having a refractive index of 1.58 to 1.70 and a repeating unit derived from a mono-functional unsaturated monomer (C-2).

The aromatic (meth)acrylate (C-1) having a refractive index of 1.58 to 1.70 may include a biphenyl or terphenyl residual group, and may be specifically represented by Chemical Formula 4.

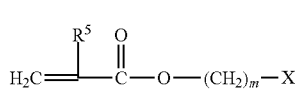

[Chemical Formula 4]

In Chemical Formula 4, $R^5$ is hydrogen or a methyl group, m is an integer ranging from 0 to 10, and X is an orthobiphenyl group, a metabiphenyl group, a parabiphenyl group, a 2,6-terphenyl group, an orthoterphenyl group, a metaterphenyl group, or a paraterphenyl group.

Specific examples of the aromatic (meth)acrylate (C-1) having a refractive index of 1.58 to 1.70 may be orthobiphenyl methacrylate, metabiphenyl methacrylate, parabiphenyl methacrylate, 2,6-terphenyl methacrylate, orthoterphenyl methacrylate, metaterphenyl methacrylate, paraterphenyl methacrylate, 4-(4-methylphenyl)phenyl methacrylate, 4-(2-methylphenyl)phenylmethacrylate, 2-(4-methylphenyl)phenyl methacrylate, 2-(2-methylphenyl)phenyl methacrylate, 4-(4-ethylphenyl)phenyl methacrylate, 4-(2-ethylphenyl)phenyl methacrylate, 2-(4-ethylphenyl) phenyl methacrylate, 2-(2-ethylphenyl)phenyl methacrylate, and the like, but are not limited thereto. These may be used singularly or in a combination of two or more.

When the biphenyl group or terphenyl group-containing (meth)acryl-based copolymer (C) is prepared, the aromatic (meth)acrylate (C-1) having a refractive index of 1.58 to 1.70 may be used in an amount of 1 to 50 wt %, and specifically 5 to 45 wt %, or 10 to 42 wt %. In this case, property balance of heat resistance and coloring properties and the like may be improved.

The mono-functional unsaturated monomer (C-2) may be specifically one or more selected from C1 to C8 alkyl(meth) acrylate such as methyl(meth)acrylate, ethyl(meth)acrylate, propyl(meth)acrylate, butyl(meth)acrylate, 2-ethylhexyl (meth)acrylate, and the like; unsaturated carboxylic acid such as acrylic acid, methacrylic acid and the like; acid anhydride such as maleic anhydride and the like; C1 to C8 hydroxy alkyl(meth)acrylate such as 2-hydroxyethyl(meth) acrylate, 2-hydroxypropyl(meth)acrylate, and the like; an unsaturated nitrile-based monomer such as (meth)acrylamide, N-alkyl(meth)acrylamide; acrylonitrile, methacrylonitrile, and the like; allyl glycidyl ether; glycidyl(meth)acrylate; and an aromatic vinyl-based monomer such as styrene, alphamethyl styrene and the like. For example, 01 to C8 alkyl(meth)acrylate may be used. In this case, excellent scratch resistance and coloring properties may be realized.

In one embodiment, a mixture of methacrylate and acrylate may be used. A weight ratio of the methacrylate and acrylate may be 6:1 to 100:1. Within the range, excellent thermal stability and fluidity of the resin composition may be ensured.

When the biphenyl group or terphenyl group-containing (meth)acryl-based copolymer (C) is prepared, the monofunctional unsaturated monomer (C-2) may be used in an amount of 50 to 99 wt %, specifically 55 to 95 wt %, or 58 to 90 wt %. Within the range, property balance of scratch resistance, fluidity, coloring properties, impact resistance and flame retardancy may be realized.

The biphenyl group or terphenyl group-containing (meth) acryl-based copolymer (C) may further include alicyclic or aromatic (meth)acrylate (C-3) having a refractive index of 1.490 to 1.579. The alicyclic or aromatic (meth)acrylate C-3 having a refractive index of 1.490 to 1.579 may be represented by Chemical Formula 5 or Chemical Formula 6.

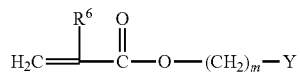

[Chemical Formula 5]

In Chemical Formula 5, $R^6$ is hydrogen or a methyl group, m is an integer ranging from 0 to 10, and Y is selected from the group consisting of a cyclohexyl group, a phenyl group, a methylphenyl group, a methylethylphenyl group, a methoxyphenyl group, a propylphenyl group, a cyclohexylphenyl group, a chlorophenyl group, a bromophenyl group, and a benzylphenyl group.

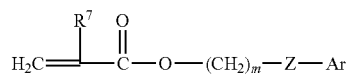

[Chemical Formula 6]

In Chemical Formula 6, $R^7$ is hydrogen or a methyl group, m is an integer ranging from 0 to 10, Z is oxygen (O) or sulfur (S), and Ar is selected from the group consisting of a cyclohexyl group, a phenyl group, a methylphenyl group, a methylethylphenyl group, a methoxyphenyl group, a cyclohexylphenyl group, a chlorophenyl group, a bromophenyl group, and a benzylphenyl group.

Examples of the alicyclic or aromatic (meth)acrylate (C-3) having a refractive index of 1.490 to 1.579 may be methacrylic acid such as cyclohexyl methacrylate, phenoxy methacrylate, 2-ethylphenoxy methacrylate, benzyl methacrylate, phenyl methacrylate, 2-ethylthiophenyl methacrylate, 2-phenylethyl methacrylate, 3-phenylpropyl methacrylate, 4-phenylbutyl methacrylate, 2-2-methylphenylethyl methacrylate, 2-3-methylphenylethyl methacrylate, 2-4-methylphenylethyl methacrylate, 2-(4-propylphenyl)ethylmethacrylate, 2-(4-(1-methylethyl)phenyl)ethylmethacrylate, 2-(4-methoxyphenyl)ethylmethacrylate, 2-(4-cyclohexylphenyl)ethyl methacrylate, 2-(2-chlorophenyl) ethyl methacrylate, 2-(3-chlorophenyl)ethyl methacrylate, 2-(4-chlorophenyl)ethyl methacrylate, 2-(4-bromophenyl) ethyl methacrylate, 2-(3-phenylphenyl)ethyl methacrylate and 2-(4-benzylphenyl)ethyl methacrylate, but are not limited thereto. These may be used singularly or in a combination of two or more.

The biphenyl group or terphenyl group-containing (meth) acryl-based copolymer (C) may include 0 to 49 wt %, and specifically 0 to 40 wt % of the alicyclic or aromatic (meth)acrylate (C-3) having a refractive index of 1.490 to 1.579. Within the range, excellent impact resistance and scratch resistance may be realized.

The biphenyl group or terphenyl group-containing (meth) acryl-based copolymer (C) may be specifically prepared by polymerization (e.g., radical polymerization) of a monomer mixture of 1 to 50 wt % of the aromatic (meth)acrylate (C-1) having a refractive index of 1.58 to 1.70, 50 to 99 wt % of the mono-functional unsaturated monomer (C-2) and 0 to 49 wt % of the alicyclic or aromatic (meth)acrylate (C-3) having a refractive index of 1.490 to 1.579. The polymerization condition and method may be selected from known condition/method for radical polymerization of (meth)acrylate-based monomers. For example, bulk polymerization, emulsion polymerization or suspension polymerization may be used.

The biphenyl group or terphenyl group-containing (meth) acryl-based copolymer (C) may have a non-cross-linking structure, for example a linear. In this way, in the case of the non-cross-linking (or linear) structure, extrusion or injection molding may be easily performed, and compatibility with another resin such as polycarbonate may be increased.

A weight average molecular weight of the biphenyl group or terphenyl group-containing (meth)acryl-based copolymer (C) may be 10,000 to 300,000 g/mol, specifically 10,000 to 150,000 g/mol, 10,000 to 100,000 g/mol, or 10,000 to 50,000 g/mol. Within the range, compatibility and mechanical properties may be simultaneously improved, and manufactured molded articles have improved coloring properties.

A refractive index of the biphenyl group or terphenyl group-containing (meth)acryl-based copolymer (C) may be 1.495 to 1.640, and a glass transition temperature thereof may be 90 to 140° C., and specifically 95 to 130° C.

The biphenyl group or terphenyl group-containing (meth) acryl-based copolymer (C) may be included in an amount of 5 to 50 wt %, specifically 5 to 40 wt % based on the total weight of the (A) to (C). Within the weight range, excellent scratch resistance, impact resistance and coloring properties may be ensured.

(D) Graft Copolymer

The graft copolymer (D) has a core-shell structure including a diene-based rubber core. Specifically, the graft copolymer (D) is an impact-reinforcing agent having a structure where an unsaturated compound is grafted to form a shell on a diene-based rubber core.

The core may be a rubbery polymer obtained by polymerization of a diene-based monomer; or a rubbery polymer obtained by copolymerization of a diene-based monomer with a monomer selected from an acryl-based monomer, a silicon-based monomer, a styrene-based monomer, and a combination thereof. A content of the core may be 30 to 80 wt %, specifically 40 to 80 wt %, or 30 to 70 wt % based on total amount of the graft copolymer (D).

The diene-based monomer may be a C4 to C6 diene-based monomer, and specifically butadiene, isoprene, and the like.

Specific examples of the core may be a polybutadiene rubber, an acryl-based rubber, a styrene/butadiene rubber, an acrylonitrile/butadiene rubber, an isoprene rubber, an ethylene-propylene-diene terpolymer (EPDM), and the like.

The graft copolymer (D) may include a shell including at least one compound selected from an acryl-based monomer, an aromatic vinyl-based monomer, an unsaturated nitrile-based monomer, and a combination thereof, and grafted on the diene-based rubber core.

The acryl-based monomer may be (meth)acrylic acid alkyl ester, (meth)acrylic acid ester, or a combination thereof. Herein, the alkyl may be C1 to C10 alkyl. Specific examples of the (meth)acrylic acid alkyl ester may be methyl(meth)acrylate, ethyl(meth)acrylate, propyl(meth) acrylate, butyl(meth)acrylate, and the like. Specific examples of the (meth)acrylic acid ester may be (meth) acrylate.

The aromatic vinyl-based monomer may be styrene, C1 to C10 alkyl- and/or halogen-substituted styrene, or a combination thereof. Specific examples of the alkyl substituted styrene may be o-ethyl styrene, methyl styrene, p-ethyl styrene, α-methyl styrene, and the like.

The unsaturated nitrile-based monomer may be acrylonitrile, methacrylonitrile, fumaronitrile, or a combination thereof.

A method of preparing the graft copolymer (D) is known in this art, and may be one of emulsion polymerization, suspension polymerization, solution polymerization or massive polymerization.

An average particle diameter of the graft copolymer (D) may be 100 to 500 nm, and specifically 100 to 300 nm. In this case, excellent coloring properties, scratch resistance and simultaneously high impact strength may be realized.

The graft copolymer (D) may be included in an amount of 1 to 50 parts by weight, preferably 1 to 40 parts by weight, and more preferably 1 to 30 parts by weight based on 100 parts by weight of the (A) to (C). Within the weight range, excellent scratch resistance, impact resistance and coloring properties may be ensured.

The thermoplastic resin composition may further one or more kinds of additive in order to improve formability and adjust balance between properties, or as need of final uses in addition to the components (A) to (D).

Specifically, the additive may be a flame retardant, a surfactant, a nucleating agent, a coupling agent, a filler, a plasticizer, an impact-reinforcing agent, a lubricant, an antibacterial agent, a release agent, a heat stabilizer, an antioxidant, a light stabilizer, an inorganic material additive, a colorant, a stabilizer, an antistatic agent, a pigment, a dye, a flame proofing agent, and the like, and these may be used singularly or in a combination of two or more.

The additive may be included in a predetermined amount as long as it does not deteriorate the properties of the resin composition and the additive may be included in an amount of less than or equal to 20 parts by weight based on 100 parts by weight of the composition, but is not limited thereto.

In another embodiment of the present invention, a molded article manufactured using the thermoplastic resin composition is provided. The molded article may be manufactured by various known processes such as injection molding, extrusion molding, blow molding, and the like, using the thermoplastic resin composition. The molded article may be made in a form of a film.

The molded article may realize excellent impact resistance, coloring properties and scratch resistance simultaneously.

Specifically, the molded article may have pencil hardness of HB to 2H measured by JIS K 5401 evaluation method.

The molded article may have a scratch resistance width of 230 to 310 μm measured by a BSP evaluation method.

The molded article may have an Izod impact strength of 7 to 60 kgf·cm/cm in a ⅛" thickness measured according to ASTM D256.

Without being bound by any particular theory, the biphenyl group-containing polycarbonate (B) may maintain excellent impact resistance and mechanical properties of polycarbonate and simultaneously show remarkably improved scratch resistance.

The biphenyl group or terphenyl group-containing (meth) acryl-based copolymer (C) has a remarkable scratch resistance improvement effect and thus may secure excellent coloring properties due to excellent compatibility with polycarbonate as well as high scratch resistance even when added in a small amount and particularly, has excellent compatibility with the biphenyl group-containing polycarbonate.

Accordingly, a thermoplastic resin composition including all these materials together according to a embodiment shows excellent coloring properties as well as high impact strength and scratch resistance.

Hereinafter, the present invention is illustrated in more detail with reference to examples and comparative examples. However, the following examples and comparative examples are provided for the purpose of descriptions and the present invention is not limited thereto.

Examples 1 to 8 and Comparative Examples 1 to 7

Each pellet-shaped resin was prepared by mixing each components in an amount shown in Table 1, melting and kneading the mixture, and extruding it into a pellet. The extrusion was performed by using a twin-screw extruder having L/D=29 and a diameter 45 mm, and herein, a barrel temperature was set at 240° C.

tured by using 20 wt % of orthobiphenyl methacrylate having a refractive index of 1.640, 77.5 wt % of methyl methacrylate, and 2.5 wt % of methyl acrylate in a common suspension polymerization method.

(C-b) Biphenyl Group-Containing (Meth)Acryl-Based Copolymer Resin-b 10 wt % of orthobiphenyl methacrylate having a refractive index of 1.640, 87.5 wt % of methyl methacrylate, and 2.5 wt % of methyl acrylate were used to manufacture a resin having a refractive index of 1.505 and a weight average molecular weight of 35,000 g/mol in a common suspension polymerization method.

(C-c) Biphenyl Group-Containing (Meth)Acryl-Based Copolymer Resin-c 20 wt % of orthobiphenyl methacrylate having a refractive index of 1.640, 20 wt % of phenyl methacrylate, 57.5 wt % of methyl methacrylate, and 2.5 wt % of methyl acrylate were used to manufacture a resin having a refractive index of 1.535 and a weight average molecular weight of 100,000 g/mol in a common suspension polymerization method.

(C'-a) Acryl-Based Resin-a 40 wt % of a phenyl methacrylate monomer having a refractive index of 1.570, 57.5 wt % of a methyl methacrylate monomer, and 2.5 wt % of methyl acrylate were used to manufacture a resin having a refractive index of 1.52 and a weight average molecular weight of 50,000 g/mol in a common suspension polymerization method.

(C'-b) Acryl-Based Resin-b 97.5 wt % of a methyl methacrylate monomer and 2.5 wt % of methyl acrylate were used to manufacture resin having a refractive index of 1.49 and a weight average molecular weight of 50,000 g/mol in a suspension polymerization method.

TABLE 1

| wt % | | Examples | | | | | | | | Comparative Examples | | | | | | |
|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 |
| (A) bisphenol A-based polycarbonate (wt %) | | 25 | 35 | 10 | 40 | 55 | 25 | 25 | 25 | 50 | 70 | 50 | 50 | | 40 | 70 |
| (B) biphenyl group-containing polycarbonate (wt %) | | 50 | 25 | 80 | 40 | 30 | 50 | 50 | 50 | | | | | 100 | 60 | |
| (C) biphenyl group or terphenyl group-containing (meth)acryl-based copolymer (wt %) | C-a | 25 | 40 | 10 | 20 | 15 | | | 25 | 50 | 30 | | | | | 30 |
| | C-b | | | | | | 25 | | | | | | | | | |
| | C-c | | | | | | | 25 | | | | | | | | |
| (C') acryl-based resin (wt %) | C'-a | | | | | | | | | | | 50 | | | | |
| | C'-b | | | | | | | | | | | | 50 | | | |
| (D) graft copolymer (parts by weight) | D-a | 9 | 9 | 9 | 4 | 9 | 9 | 9 | | 9 | 9 | 9 | 9 | 9 | 9 | 4 |
| | D-b | | | | | | | | 9 | | | | | | | |

(A) Bisphenol A-Based Linear Polycarbonate Resin

Polycarbonate having a weight average molecular weight of 25,000 g/mol was used.

(B) Biphenyl Group-Containing Modified Polycarbonate Resin

A monomer comprising 40 mol % of bisphenol A, 10 mol % of 4,4'-biphenol, 50 mol % of dimethylbisphenol A was reacted with diphenylcarbonate, obtaining a modified bisphenol A-based linear polycarbonate resin, and the modified bisphenol A-based linear polycarbonate resin was used to manufacture modified polycarbonate having a weight average molecular weight of 30,000 g/mol.

(C-a) Biphenyl Group-Containing (Meth)Acryl-Based Copolymer Resin-a

A resin having a refractive index of 1.52 and a weight average molecular weight of 50,000 g/mol was manufac- (D-a) Graft Copolymer-a A copolymer having a core-shell structure including a polybutadiene rubber core and methylmethacrylate and butylacrylate graft-copolymerized thereon was used. It is a copolymer including 70% of polybutadiene rubber and having an average particle diameter of 250 nm, prepared in a generally-used emulsion polymerization method.

(D-b) Graft Copolymer-b

A g-ABS (graft-Acrylonitrile-Butadiene-Styrene) copolymer including a polybutadiene rubber core and styrene and acrylonitrile graft-copolymerized thereon was used. It is a copolymer having 58% of polybutadiene rubber and having an average particle diameter of 270 nm, prepared in a generally-used emulsion polymerization method.

Property Test

Each pellet according to Examples 1 to 8 and Comparative Examples 1 to 7 was dried at 80° C. for 6 hours, made into a specimen having a size of L 90 mm×W 50 mm×T 2.5 mm by using a 6 oz injector at a cylinder temperature ranging from 240 to 250° C. and a mold temperature ranging from 55 to 60° C. and into a Izod impact strength specimen according to a standard of ASTM D256. Each specimen was measured regarding coloring properties, scratch resistance, pencil hardness, impact strength, and fluidity as follows, and the results are provided in Table 2.

(1) Coloring Properties: each specimen was examined with naked eyes.

(2) Scratch Resistance: measured in a BSP (Ball-type Scratch Profile) evaluation method. After forming a 10 to 20 mm-long scratch on the surface of the L 90 mm×W 50 mm×t 2.5 mm-sized specimen by using a spherically-shaped metal tip having a diameter of 0.7 mm with a load of 1,000 g at a speed of 75 mm/min, the width (μm) of the scratch was measured by scanning the surface of the scratch with a metal stylus tip having a diameter of 2 μm by using a contact-type surface profile analyzer XP-1 made by Ambios Ltd. to evaluate scratch resistance. Herein, as the scratch has a smaller width, scratch resistance is more excellent. (unit: μm)

(3) Pencil Hardness: the specimen was measured regarding pencil hardness according to a reference of 3B, 2B, B, HB, F, H, 2H, and 3H in a method defined in JIS K 5401. Herein a higher H indicates higher scratch resistance performance, and a higher B indicates lower scratch resistance performance.

(4) Impact Strength: measured by making a notch in a ⅛"-thick Izod specimen according to an evaluation method defined in ASTM D256. (unit: kgf·cm/cm)

(5) Fluidity (Melt Flow Index, MI): measured at 250° C. under a condition of 10 kg in an evaluation method defined in ASTM D1238. (unit: g/10 min)

Example 5 showed pencil hardness in an F level and thus improved impact strength compared with Comparative Examples 2 and 6 showing pencil hardness of the same F level.

Comparative Example 1 included no biphenyl group-containing polycarbonate (B) and thus showed insufficient impact strength with a reference to a case including the graft copolymer (D) in an amount of 9 parts by weight.

Comparative Example 2 showed insufficient impact strength compared with Example 5 having pencil hardness of F.

Comparative Examples 3 and 4 used a blend of polycarbonate and an acryl-based resin, and herein, Comparative Example 3 showed remarkably deteriorated impact strength, while Comparative Example 4 showed remarkably deteriorated coloring properties.

Comparative Example 5 included no biphenyl group or terphenyl group-containing (meth)acryl-based copolymer (C) and showed insufficient impact strength with a reference to a case including the graft copolymer (D) in an amount of 9 parts by weight.

Comparative Example 6 showed insufficient impact strength compared with Example 5 having pencil hardness of F.

Comparative Example 7 showed insufficient impact strength compared with Example 4 including the graft copolymer (D) in an amount of 4 parts by weight.

Resultantly, Examples 1 to 8 including all of the (A) to (D) showed remarkably excellent coloring properties, scratch resistance, pencil hardness, and impact strength compared with Comparative Examples.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

TABLE 2

| Properties | Examples | | | | | | | | Comparative Examples | | | | | | |
| --- | --- | --- | --- | --- | --- | --- | --- | --- | --- | --- | --- | --- | --- | --- | --- |
| | 1 | 2 | 3 | 4 | 5 | 6 | 7 | 8 | 1 | 2 | 3 | 4 | 5 | 6 | 7 |
| Coloring properties | ○ | ○ | ○ | ○ | ○ | ○ | ○ | ○ | ○ | ○ | Δ | x | ○ | ○ | ○ |
| Scratch resistance (BSP) | 262 | 262 | 260 | 260 | 292 | 260 | 261 | 263 | 263 | 292 | 262 | 265 | 259 | 290 | 262 |
| Pencil hardness | H | H | H | H | F | H | H | H | H | F | H | H | H | F | H |
| Impact strength (Izod) | 21.6 | 18.0 | 20.7 | 15.9 | 55.5 | 18.5 | 21.9 | 17.2 | 14.9 | 40.9 | 7.0 | 17.3 | 16.0 | 49.8 | 11.1 |
| Fluidity (MI) | 23 | 35 | 21 | 29 | 20 | 27 | 18 | 27 | 36 | 16 | 40 | 15 | 22 | 20 | 30 |

The results of Table 2 show that each specimen respectively formed of the resin compositions according to Examples 1 to 8 realized excellent coloring properties, scratch resistance, pencil hardness, and impact strength, simultaneously.

Example 4 including the graft copolymer (D) in an amount of 4 parts by weight showed excellent impact strength compared with Comparative Example 7 including the graft copolymer (D) in the same amount, and showed equivalent or higher impact strength than those of Comparative Examples 1, 3, and 5 including the graft copolymer (D) in an amount of 9 parts by weight.

What is claimed is:

1. A thermoplastic resin composition comprising:
   (A) bisphenol A-based polycarbonate,
   (B) biphenyl group-containing polycarbonate,
   (C) a biphenyl group-containing or terphenyl group-containing (meth)acryl-based copolymer, and
   (D) a graft copolymer,
   wherein the biphenyl group-containing polycarbonate (B) comprises 10 to 85 mol % of a repeating unit represented by Chemical Formula 1, 5 to 30 mol % of a repeating unit represented by Chemical Formula 2, and 10 to 80 mol % of a repeating unit represented by Chemical Formula 3:

[Chemical Formula 1]

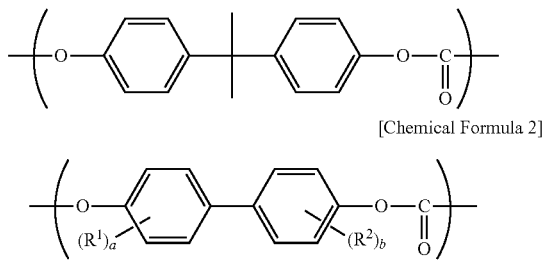

[Chemical Formula 2]

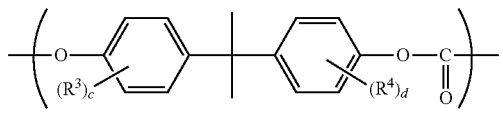

wherein in Chemical Formula 2,
$R^1$ and $R^2$ are independently a substituted or unsubstituted C1 to C6 alkyl group, and a and b are independently an integer ranging from 0 to 4,

[Chemical Formula 3]

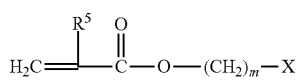

wherein in Chemical Formula 3,
$R^3$ and $R^4$ are independently a substituted or unsubstituted C1 to C6 alkyl group, and c and d are independently an integer ranging from 1 to 4.

2. The thermoplastic resin composition of claim 1, wherein the thermoplastic resin composition comprises:
10 to 85 wt % of the bisphenol A-based polycarbonate (A),
5 to 80 wt % of the biphenyl group-containing polycarbonate (B),
5 to 50 wt % of the biphenyl group-containing or terphenyl group-containing (meth)acryl-based copolymer (C), and
1 to 50 parts by weight of the graft copolymer (D) based on 100 parts by weight of (A) to (C).

3. The thermoplastic resin composition of claim 1, wherein the bisphenol A-based polycarbonate (A) has a weight average molecular weight of 10,000 to 50,000 g/mol.

4. The thermoplastic resin composition of claim 1, wherein the biphenyl group-containing polycarbonate (B) has a weight average molecular weight of 20,000 to 40,000 g/mol.

5. The thermoplastic resin composition of claim 1, wherein the biphenyl group or terphenyl group-containing (meth)acryl-based copolymer (C) comprises:
a repeating unit derived from aromatic (meth)acrylate having a refractive index of 1.58 to 1.70 (C-1) and
a repeating unit derived from a mono-functional unsaturated monomer (C-2).

6. The thermoplastic resin composition of claim 5, wherein the aromatic (meth)acrylate having a refractive index of 1.58 to 1.70 (C-1) is represented by Chemical Formula 4:

[Chemical Formula 4]

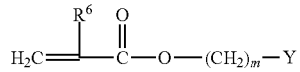

wherein in Chemical Formula 4,
$R^5$ is hydrogen or a methyl group, m is an integer ranging from 0 to 10, X is an orthobiphenyl group, a metabiphenyl group, a parabiphenyl group, a 2,6-terphenyl group, an orthoterphenyl group, a metaterphenyl group, or a paraterphenyl group.

7. The thermoplastic resin composition of claim 5, wherein the biphenyl group or terphenyl group-containing (meth)acryl-based copolymer (C) is a copolymer of:
1 to 50 wt % of the aromatic (meth)acrylate having a refractive index of 1.58 to 1.70 (C-1) and
50 to 99 wt % of the mono-functional unsaturated monomer (C-2).

8. The thermoplastic resin composition of claim 5, wherein the biphenyl group or terphenyl group-containing (meth)acryl-based copolymer (C) has a refractive index of 1.490 to 1.579 and further comprises 49 wt % or less of alicyclic or aromatic (meth)acrylate (C-3) represented by Chemical Formula 5 or Chemical Formula 6:

[Chemical Formula 5]

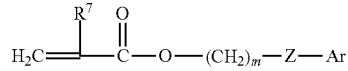

wherein in Chemical Formula 5,
$R^6$ is hydrogen or a methyl group, m is an integer ranging from 0 to 10, and Y is selected from the group consisting of a cyclohexyl group, a phenyl group, a methylphenyl group, a methylethylphenyl group, a methoxyphenyl group, a propylphenyl group, a cyclohexylphenyl group, a chlorophenyl group, a bromophenyl group, and a benzylphenyl group,

[Chemical Formula 6]

$$H_2C=\overset{R^7}{\underset{}{C}}-\overset{O}{\underset{}{C}}-O-(CH_2)_m-Z-Ar$$

wherein in Chemical Formula 6,
$R^7$ is hydrogen or a methyl group, m is an integer ranging from 0 to 10, Z is oxygen (O) or sulfur (S), and Ar is selected from the group consisting of a cyclohexyl group, a phenyl group, a methylphenyl group, a methylethylphenyl group, a methoxyphenyl group, a cyclohexylphenyl group, a chlorophenyl group, a bromophenyl group, and a benzylphenyl group.

9. The thermoplastic resin composition of claim 1, wherein the graft copolymer (D) has a core-shell structure including a diene-based rubber core.

10. The thermoplastic resin composition of claim 9, wherein the graft copolymer (D) comprises a shell including at least one compound selected from an acryl-based monomer, an aromatic vinyl-based monomer, an unsaturated nitrile-based monomer, and a combination thereof, and grafted on the diene-based rubber core.

11. The thermoplastic resin composition of claim 9, wherein the graft copolymer (D) comprises 30 to 80 wt % of the diene-based rubber core.

12. A molded article manufactured using the thermoplastic resin composition of claim 1.

13. The molded article of claim 12, wherein the molded article has pencil hardness of HB to 2H measured by JIS K 5401 evaluation method, a scratch resistance width of 230 to 310 μm measured by a BSP evaluation method, and
an Izod impact strength of 7 to 60 kgf·cm/cm in a ⅛" thickness measured according to ASTM D256.

* * * * *

UNITED STATES PATENT AND TRADEMARK OFFICE
CERTIFICATE OF CORRECTION

PATENT NO. : 9,605,147 B2
APPLICATION NO. : 14/904806
DATED : March 28, 2017
INVENTOR(S) : Kee-Hae Kwon et al.

It is certified that error appears in the above-identified patent and that said Letters Patent is hereby corrected as shown below:

In the Specification

Column 2 delete Chemical Formula 3 and insert:

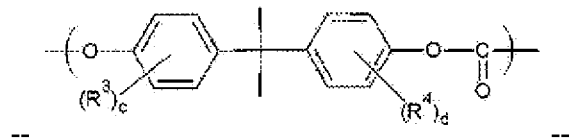

--                                                                        --

Column 10, delete Line 17 and insert:
--styrene may be o-ethyl styrene, m-ethyl styrene, p-ethyl--

In the Claims

Claim 13, Column 17, delete Line 1 and insert:
--a scratch resistance width of 230 to 310 μm measured by--

Signed and Sealed this
First Day of August, 2017

Joseph Matal
*Performing the Functions and Duties of the*
*Under Secretary of Commerce for Intellectual Property and*
*Director of the United States Patent and Trademark Office*